United States Patent [19]

Manner

[11] 3,978,032

[45] Aug. 31, 1976

[54] POLYMERIZATION OF ETHYLENICALLY UNSATURATED MONOMER

[75] Inventor: James A. Manner, Akron, Ohio

[73] Assignee: PPG Industries, Inc., Pittsburgh, Pa.

[22] Filed: Feb. 28, 1975

[21] Appl. No.: 553,949

[52] U.S. Cl. .............................. 526/344; 260/63 R; 260/75 UA; 260/77.5 R; 260/97; 260/875; 526/89; 526/213; 526/227; 526/345
[51] Int. Cl.² ............... C08F 114/06; C08F 214/06
[58] Field of Search ................ 260/92.8 R, 92.8 W, 260/87.5 R

[56] References Cited
UNITED STATES PATENTS

| 3,049,521 | 8/1962 | Burkholder | 260/92.8 W |
|---|---|---|---|
| 3,637,633 | 1/1972 | Dixon | 260/92.8 W |
| 3,720,700 | 3/1973 | Norback | 260/92.8 R |

Primary Examiner—Harry Wong, Jr.
Attorney, Agent, or Firm—Irwin M. Stein

[57] ABSTRACT

Ethylenically unsaturated material susceptible to free-radical polymerization, e.g., vinyl chloride monomer, is polymerized, e.g., in an aqueous medium, with an initiator system comprising, in combination, alkaline buffering reagent, e.g., sodium bicarbonate, organic acid anhydride, e.g., isobutyric anhydride, peroxygen compound selected from organic peroxy acid (peracid), e.g., peracetic acid, and hydrogen peroxide, and alkyl haloformate, e.g., ethyl chloroformate. The initiator system is added to the polymerization medium to form the initiator(s) in situ.

17 Claims, No Drawings

POLYMERIZATION OF ETHYLENICALLY UNSATURATED MONOMER

DESCRIPTION OF THE INVENTION

The polymerization of ethylenically unsaturated materials susceptible to free-radical polymerization, e.g., unsaturated vinyl-type monomers, such as vinyl chloride, with organic peroxides is well recorded in the literature and has found extensive commercial application. Commercially available organic peroxides, while widely used as polymerization initiators, have limited utility because their rate of decomposition at a particular temperature is fixed and because the temperature at which the polymerization of the monomers conducted affects the properties of the polymer product produced. Thus, for optimum results, the rate of decomposition of the initiator at the polymerization temperature should be such that the polymerization can be conducted at a useful rate. It is, of course, axiomatic that organic peroxides are relatively unstable compounds and that their instability increases with their reactivity. Highly reactive organic peroxides have the disadvantage of decomposing, often rapidly, at room temperature.

At temperatures above room temperature, highly reactive organic peroxides are often explosive. Many organic peroxides have the disadvantage of being very shock-sensitive. It is known, for example, that diacetyl peroxide, dipropionyl peroxide and diisobutyryl peroxide decompose explosively upon heating. The aforementioned compounds are also very shock-sensitive, which accounts for their availability in phlegmatized form. Dipivaloyl peroxide is probably not in use commercially despite its high reactivity because of its great instability.

It has been suggested that some of the difficulties in utilizing preformed peroxy compounds such as the dialkyl peroxydicarbonates as free-radical initiators can be minimized by preparing the peroxydicarbonate compound in situ. U.S. Pat. No. 3,022,281, for example, describes the formation of an organic peroxydicarbonate in the presence of vinyl chloride monomer by reacting an alkyl chloroformate that is present in the monomer phase with hydrogen peroxide that is present in an alkaline water phase. The same reaction is described in U.S. Pat. No. 3,575,945. In another vein, U.S. Pat. No. 3,637,633 describes the preparation of a preformed peroxy compound mixture by mixing an acid halide of the formula R'CO.X and a haloformate of the formula R"O.CO.X with hydrogen peroxide in the presence of a base. R' and R" are described as hydrocarbon residues and X is a halogen atom. This reaction, which occurs outside the polymerization vessel and therefore not in the presence of the polymerizable monomer, is reported to produce a mixture of a diacyl peroxide, a peroxy-dicarbonate, and an acyl peroxycarbonate. The mixture of the aforementioned peroxy compounds is described as useful as a catalyst for the free-radical polymerization of vinyl chloride.

It has now been discovered that some of the hazards and problems associated with the use of peroxy compounds as free-radical initiators for the polymerization of ethylenically unsaturated materials can be eliminated by the use of a novel initiator system. More particularly, it has been discovered that the use, in combination, of organic acid anhydride, peroxygen compound selected from the group consisting of an organic peroxy acid (peracid) and hydrogen peroxide, haloformate of hydrocarbon residue, e.g., alkyl chloroformate, and an alkaline buffering reagent can effect the polymerization of ethylenically unsaturated materials charged to a polymerization vessel. The aforementioned reactants are introduced into the polymerization medium where, in the presence of the ethylenically unsaturated material, they form in situ the initiator(s) that initiate the polymerization reaction.

DETAILED DESCRIPTION

The process described herein is applicable to the polymerization of ethylenically unsaturated materials, i.e., materials containing an ethylenic

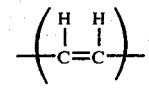

or vinyl ($CH_2 = C<$) linkage that are susceptible to free-radical polymerization. Examples of such compounds include: aryl-substituted olefins, such as styrene, alpha-chlorostyrene and the like; acrylic and alpha-substituted acrylic acids, e.g., methacrylic acid, $C_1 - C_4$ alkyl esters, nitriles and amides of such acids, such as acrylonitrile, alpha-methacrylonitrile, methyl acrylate, ethyl acrylate, methyl methacrylate, methacrylamide, acrylamide and the like; vinyl esters, ethers, ketones and halogen-containing vinyl and vinylidene compounds, such as vinyl chloride, vinylidene chloride, vinyl bromide, vinylidene bromide, vinyl acetate, vinyl propionate, vinyl butyrate, vinyl fluoride, vinylidene fluoride, 1,1-chlorofluoroethylene, tetrafluoroethylene, 1,1-difluoro-2,2-dichloroethylene, perfluoropropylene, 3,3,3-trifluoropropylene, 3,3,3-trichloropropylene and 2-chloropropylene and the like; and unsaturated polyesters, particularly water dispersible unsaturated polyesters having a high acid number.

Unsaturated polyesters are prepared typically by the reaction of dibasic acids or anhydrides and polyhydric alcohols, one of which is unsaturated. Generally, the acid or anhydride reactant is unsaturated. Common examples thereof include maleic acid, maleic anhydride, fumaric acid and itaconic acid. Often, saturated acids or anhydrides are used in addition to the unsaturated acid. Examples thereof include chlorendic acid and anhydride, succinic acid and anhydride, sebacic acid, o-phthalic acid and anhydride, isophthalic acid, terephthalic acid and adipic acid.

Polyhydric alcohols typically are dihydric but may contain three or more hydroxyls. Examples of such alcohols include ethylene glycol, propylene glycol, diethylene glycol, triethylene glycol, neopentyl glycol, tetraethylene glycol, butylene glycol, dipropylene glycol, glycerol, trimethylolethane, trimethylolpropane, pentaerythritol, sorbitol and others.

The preparation of unsaturated polyesters is well known. See, for example, U.S. Pat. No. 3,390,135. By further reacting the unsaturated polyester with a vinyl type monomer, such as vinyl acetate, styrene and methyl methacrylate, cross-linked, three-dimensional resins are formed. Copolymerization of the unsaturated polyester with the vinyl monomer to form polyester resins is free-radical initiated since the reaction is essentially a vinyl-type polymerization. The present process is applicable, therefore, to the preparation of such polyester resins.

Additional applications for the aforementioned initiator system include curing agents for elastomers, e.g., natural and butadiene rubbers, polyurethanes and adhesives and as cross-linking agents for polyolefins, e.g., polyethylene and ethylene-containing copolymers.

The present process is particularly applicable to the polymerization of vinyl chloride, as well as the copolymerization of mixtures of two or more of the aforementioned monomeric materials, e.g., the polymerization of vinyl chloride with other copolymerizable monomers, such as vinyl bromide, vinylidene chloride, vinyl acetate, methyl acrylate, methyl methacrylate and the like. When copolymerizing vinyl chloride with other monomer(s) copolymerizable therewith, vinyl chloride is used generally in amounts greater than 50 mole percent, e.g., from 75 to 95 mole percent of vinyl chloride and from 5 to 25 mole percent of one or more of the other unsaturated copolymerizable monomer(s). The type of polymer products contemplated herein include graft, random, alternating and block copolymers. The exact nature of the polymer product is more a function of the polymerization procedure than the particular initiator used.

The type of polymer produced by the polymerization or copolymerization of the aforementioned polymerizable materials, e.g., monomers such as vinyl chloride, depends to a large extent on the temperature at which the polymerization is conducted. For example, polyvinyl chloride having properties useful for major commercial applications of that polymer are prepared at polymerization temperatures in the range of 40°– 65°C.

Anhydrides useful in the practice of the present process are anhydrides of aliphatic and aromatic carboxylic acids, preferably saturated monocarboxylic acids, which can be represented by the general formula,

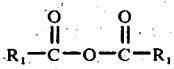

wherein $R_1$ is alkyl, aryl or cycloalkyl radicals. Generally, the alkyl radical contains from 1 to 20 carbon atoms, more commonly from 1 to 12 carbon atoms. The aryl and cycloalkyl radicals typically contain from 6 to 10 carbon atoms. The alkyl radicals can be branched or straight chain, and the alkyl, aryl and cycloalkyl radicals can contain substituents that do not adversely affect the polymerization reaction or polymer product, e.g., alkoxy, halogen, such as chlorine, bromine and fluorine, hydroxyl, amido, cyano, nitroso, nitro, etc., groups.

Preferably, as in the polymerization of vinyl-type unsaturated materials, e.g., vinyl chloride, $R_1$ is a straight chain alkyl group or the isopropyl group.

Examples of acid anhydrides include: acetic anhydride, propionic anhydride, butyric anhydride, isobutyric anhydride, pivalic anhydride, valeric anhydride, isovaleric anhydride, 2-methyl butyric anhydride, 2-ethyl butyric anhydride, caproic anhydride, caprylic anhydride, isocaproic anhydride, n-heptanoic anhydride, nonoic anhydride, decanoic anhydride, neodecanoic anhydride, undecanoic anhydride, neoheptanoic anhydride, lauric anhydride, tridecanoic anhydride, 2-ethyl hexanoic anhydride, acetic propionic anhydride, acetic isobutyric anhydride, myristic anhydride, palmitic anhydride, stearic anhydride, phenylacetic anhydride, cyclohexanecarboxylic anhydride, 3-methylcyclopentanecarboxylic anhydride, beta-methoxy propionic anhydride, alpha-ethoxy butyric anhydride, benzoic anhydride, o-, m-, and p-toluic anhydride, 2, 4, 6-trimethylbenzoic anhydride, o-, m-, and p-chlorobenzoic anhydride, o-, m-, and p-bromobenzoic anhydride, o-, m-, and p-nitrobenzoic anhydride, o- and p-hydroxybenzoic anhydride, o-, m-, and p-aminobenzoic anhydride, and o-, m-, and p-methoxybenzoic anhydride.

The peroxygen compound used in the aforementioned initiator system is selected from the group consisting of organic peroxy acid (peracid) and an inorganic peroxide of which hydrogen peroxide and sodium peroxide are the most common, is used. Preferably, the peracid is a saturated aliphatic or aromatic carboxylic acid. Such peracids can be represented by the general formula,

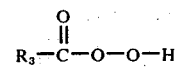

wherein $R_3$ is an aliphatic, e.g., alkyl, radical of from 1 to 20 carbon atoms or an aryl radical of from 6 to 10 carbon atoms. Preferably, the alkyl radical contains from 1 to 12 carbon atoms. The aliphatic group can, of course, be branched or straight chain. The alkyl and aryl radicals can contain substituent groups that do not adversely affect the polymerization reaction or polymer product, e.g., alkoxy, halogen, such as chlorine, bromine or fluorine, hydroxyl, amido, cyano, nitroso, nitro, etc. groups.

Examples of peracids include: peracetic acid, permonochloroacetic acid, trifluoroperacetic acid, perdichloroacetic acid, pertrichloroacetic acid, perpropionic acid, permonochloropropionic acid, perdichloropropionic acid, perbromoacetic acid, perbromopropionic acid, per-alpha-chlorolauric acid, per-alpha, alpha-dichlorolauric acid, per-1,2-hydroxystearic acid, per-alpha-bromocapric acid, per-alpha-bromostearic acid, perglycolic acid, peroxylactic acid, perpyruvic acid, 3-chloroperbenzoic acid, m-bromoperbenzoic acid, pentafluoroperbenzoic acid, p-tertiarybutyl perbenzoic acid, per-n-butyric acid, perisobutyric acid, pervaleric acid, perpivalic acid, perisovaleric acid, percaproic acid, percaprylic acid, pernonoic acid, perdecanoic acid, perneodecanoic acid, perheptanoic acid, perundecanoic acid, perlauric acid, pertridecanoic acid, permyristic acid, perpentadecanoic acid, perpalmitic acid, perheptadecanoic acid, perstearic acid, pernonadecanoic acid, pereicosanoic acid, per(alpha-ethyldecanoic) acid, per(alpha-ethyldodecanoic) acid, per(alpha-phenyldodecanoic) acid, phenylperacetic acid, peroxyfuroic acid, cyclohexanepercarboxylic acid, perbenozic acid, 2-, 3-, and 4-nitroperbenzoic acid, 2-chloroperbenozic acid, 4-chloroperbenozic acid, 2,4- and 3,4-dichloroperbenzoic acid, p-fluoroperbenzoic acid, 2-methylperbenzoic acid, p-isopropylperbenzoic acid, 4-methoxyperbenzoic acid, 4-cyanoperbenzoic acid, o- and m-aminoperbenzoic acid, o- and p-hydroxyperbenzoic acid, o-bromoperbenzoic acid, 2-methylperbutyric acid, 2-ethyl perbutyric acid and perphthalic acid.

The peroxygen compound can be also an inorganic peroxide. Any inorganic peroxide capable of providing the peroxy group in the polymerization medium can be used. Of the inorganic peroxides, the most common is hydrogen peroxide and sodium peroxide. Any source of hydrogen peroxide, i.e., a peroxygen compound which, when dissolved in the polymerization medium, yields hydrogen peroxide, can be used. Sodium peroxide is exemplary of the aforementioned peroxygen compound and can be used in place of hydrogen peroxide. Hydrogen peroxide is, of course, commercially available in several strengths and is prepared commercially by the alternate catalytic reduction-oxidation of an anthraquinone, e.g., 2-ethylanthraquinone. Strengths at which hydrogen peroxide is commercially available include: 3 percent, 6 percent, 27.5 percent, 30 percent, 35 percent, 50 percent, 70 percent and 90 percent. Preferably the more concentrated grades, e.g, 27.5 percent – 50 percent are used since such grades do not introduce as much water into the system as the less concentrated grades and are safer to handle than the more concentrated grades. Sodium peroxide is prepared commonly by heating metallic sodium at about 300°C. in a retort in a current of dry air from which carbon dioxide has been removed.

The haloformate of hydrocarbon residue used in the initiator system in combination with the aforementioned acid anhydride and peroxygen compound can be represented by the general formula:

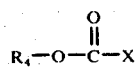

wherein $R_4$ is selected from the group consisting of $C_1 - C_{20}$ alkyl and alkenyl, $C_6 - C_{12}$ cycloalkyl, $C_7 - C_{10}$ aralkyl having a single aromatic ring, and $C_6 - C_8$ aryl, and X is halogen, e.g., fluorine, chlorine, bromine and iodine. Preferably $R_4$ is selected from the group consisting of $C_2 - C_{12}$, e.g., $C_2 - C_8$, alkyl, $C_6 - C_{10}$ cycloalkyl, phenyl and benzyl, and X is chlorine or bromine. $R_4$ can, of course, be branched or straight chain. More preferably X is chlorine. Examples of the aforementioned haloformates include methyl chloroformate, ethyl chloroformate, ethyl bromoformate, n-propyl chloroformate, isopropyl chloroformate, isopropyl bromoformate, n-butyl chloroformate, isobutyl chloroformate, secondary butyl chloroformate, tertiary butyl chloroformate, n-amyl chloroformate, t-amyl chloroformate, hexyl chloroformate, 2-ethylhexyl chloroformate, lauryl chloroformate, cetyl chloroformate, stearyl chloroformate, allyl chloroformate, cyclohexyl chloroformate, 4-($C_1$-$C_5$ alkyl) cyclohexyl chloroformate such as 4-tertiarybutyl cyclohexyl chloroformate, 3,3,5-trimethylcyclohexyl chloroformate, phenyl chloroformate, benzyl chloroformate, and 2-phenoxyethyl chloroformate.

Acid anhydrides are typically prepared commercially by heating the corresponding carboxylic acid with acetic anhydride and distilling off acetic acid. This method is useful for preparing symmetrical anhydrides. A further process for making acid anhydrides is to condense an acid chloride with the sodium salt of the same acid. This process can be used to prepare symmetrical and unsymmetrical anhydrides. Thus, by condensing an acid chloride with the sodium salt of a different carboxylic acid, unsymmetrical acid anhydrides can be prepared.

Numerous methods are known for the preparation of peroxy acids. The lower peroxycarboxylic acids (to $C_4$) are generally prepared by the direct acid-catalyzed reaction of the parent carboxylic acid and 30 to 98 percent hydrogen peroxide. Sulfuric acid or sulfonic acid type ion exchange resins are the most effective and most commonly used catalysts. With water insoluble aliphatic carboxylic acids up to $C_{16}$ or $C_{18}$, concentrated sulfuric acid is a mutual solvent and reaction medium. Yields of $C_6 - C_{16}$ peroxy acids are usually high and sometimes quantitative when the appropriate excess of 50 to 65 percent hydrogen peroxide is employed. The $C_{18}$ and longer chain aliphatic acids are too insoluble in sulfuric acid, but methanesulfonic acid can be used instead. Chain substituted aliphatic or aromatic peroxy acids can also be prepared by the methanesulfonic acid procedure. Peroxycarboxylic acids have also been obtained by the reaction of carboxylic acid chlorides or anhydrides with either hydrogen peroxide or sodium peroxide. A further method for the preparation of peroxycarboxylic acids involves the controlled free-radical initiated auto-oxidation of aldehydes in the liquid phase. Details of the aforementioned methods can be found in *Organic Peroxides*, Volume I, pages 313–433, Daniel Swern, Editor, Wiley-Interscience, New York, New York (1970).

Haloformates are prepared typically by the action of the corresponding carbonyl halide, e.g., carbonyl chloride (phosgene) on the corresponding aliphatic, cycloaliphatic or aromatic alcohol.

The amount of acid anhydride used in the practice of the present process can vary widely and will depend on the monomer polymerized, the amount of haloformate used and the temperature at which the polymerization is conducted. Typically, however, from about 0.001 to about 3 weight percent of acid anhydride, based on the total amount of monomer polymerized, is used. With respect to the polymerization of vinyl chloride, amounts of from about 0.01 to about 1 weight percent acid anhydride are suitable.

The amount of peracid used in the practice of the one embodiment of the present process will vary, depending on the amount of anhydride and haloformate used. An equimolar amount of peracid, based on the anhydride and haloformate is preferred; however, less than or more than a molar equivalent of peracid can be used, e.g., a mole ratio of peracid to the sum of anhydride plus haloformate of from about 0.2:1 to about 10:1 is contemplated herein. Preferably, a mole ratio of 1:1 is used.

The amount of hydrogen peroxide used in the practice of the present process will vary with the amount of anhydride and haloformate used. Generally, from about 0.1 to about 10.0 and preferably from about 0.2 to about 2.0 moles of hydrogen peroxide per mole of the sum of anhydride and haloformate will be used; however, more than such amounts can be used.

The amount of haloformate, e.g., alkyl haloformate used in the practice of the present process can vary widely also and will depend on the monomer polymerized, the amount of acid anhydride used and the temperature at which the polymerization is conducted. Typically however, from about 0.001 to about 3 weight percent of haloformate, based on the total amount of monomer polymerized, is used. With respect to the polymerization of vinyl chloride, amounts of from about 0.01 to about 1 weight percent haloformate are suitable. The mole ratio of the haloformate to acid anhydride can vary but commonly will be between about 0.1:1 and about 10:1, preferably from about 0.2:1 to about 1:1.

The relative amounts of acid anhydride, peroxygen compound and haloformate used can vary; but, should be in amounts sufficient to polymerize the ethylenically unsaturated monomer. Thus, the aforementioned initiator reactants should be used in amounts sufficient to provide at least about an 80 percent conversion of monomer in about 16 hours at the temperature of the polymerization. As pointed out hereinafter, it is belived that the initiator reactants give rise in situ to the formation of dialkyl peroxydicarbonate, diacyl peroxide and acyl peroxycarbonate depending of course on the reactants used. Each of the peroxy compounds theoretically produced have a particular reactivity, i.e., generate free radicals more or less efficiently, at the temperature of the polymerization. By the judicious selection of reactants, peroxy compounds can be prepared theoretically in situ to give a smooth and continuous polymerization without induction periods and initiator exhaustion. Thus, it is possible to provide for the presence of fast acting, moderately active and relatively slow acting peroxy compounds in the polymerization medium and thereby balance the reactivity of the peroxy compounds so that as one exhausts, another takes over the initiating function.

In addition to the organic acid anhydride, peroxygen compound and haloformate, it has been found that the presence of an alkaline buffering reagent in the polymerization medium is necessary to conduct effectively the polymerization reaction.

The alkaline buffering reagent can be added to the polymerization medium as part of the initiator system or can be present in the polymerization system as part of the polymerization recipe. Regardless of the reason for its introduction, sufficient alkaline buffering reagent should be present in the polymerization medium to satisfy both the requirements of the polymerization recipe and the initiator system. With respect to the initiator system, the alkaline buffering reagent, i.e., a base, serves to neutralize the acidic species by-products resulting from reaction of the initiator reactants. Examples of such acid by-products include; hydrogen chloride and organic acids. The alkaline buffering reagent should be soluble in the polymerization medium and/or the phase wherein the initiator components are present.

Suitable alkaline buffering reagents that can be used include the basic compounds of alkali and alkaline earth metals, such as the hydroxides, carbonates, bicarbonates, organic acid salts, phosphates, etc. Examples of the aforesaid metals include sodium, potassium and calcium. Examples of suitable basic compounds include: sodium hydroxide, sodium bicarbonate, sodium carbonate, potassium bicarbonate, calcium acetate, calcium carbonate, calcium hydroxide, calcium magnesium orthosilicate, the various phosphates of calcium and sodium, e.g., trisodium phosphate, sodium pyrophosphate, calcium orthophosphate, calcium pyrophosphate, sodium acetate, borax, potassium tartrate, sodium citrate, ammonium hydroxide, organic bases, e.g., the Triton surfactants, and mixtures of such basic compounds.

Organic bases that can be used as the alkaline buffering reagent are those soluble organic compounds that can abstract a hydrogen atom (proton) from hydrogen peroxide or the peracid.

Examples of such compounds include: pyridine, pyrrolidone, 1,4-dioxane, tetrahydrofuran and quaternary ammonium hydroxide, such as, tetramethylammonium hydroxide, trimethyl s-butyl ammonium hydroxide, tetraethylammonium hydroxide, trimethyl cetylammonium hydroxide, dioctadecyl dimethylammonium hydroxide, octadecyl dimethyl benzyl ammonium hydroxide, and benzyl trimethylammonium hydroxide (Triton B). The quaternary ammonium hydroxides are preferred. These compounds dissociate in solution, e.g., aqueous solution and have the same basic strength in water as sodium or potassium hydroxide.

Quaternary ammonium hydroxides can be represented by the general formula,

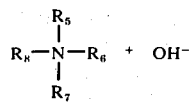

wherein $R_5$, $R_6$, $R_7$ and $R_8$ are each selected from the group consisting of $C_1$–$C_{20}$ alkyl, and $C_7$–$C_{20}$ aralkyl. Preferably, at least two of the organic substituents are alkyl radicals and more preferably lower alkyl ($C_1$–$C_4$) substituents. The aforementioned compounds, more commonly written $(R)_4N^+OH^-$, can be prepared by shaking the corresponding quaternary ammonium halide or acid sulfate with silver hydroxide or barium hydroxide respectively.

The amount of alkaline buffering reagent used is not critical and typically varies from 100 to 1,000 weight percent, based on the combined amount of acid anhydride and haloformate used. A suitable concentration of buffering reagent is from about 0.01 percent to about 10 percent by weight, and preferably from about 0.5 percent to about 1.5 percent, of the monomer feed. The buffering reagent is used to maintain the pH of the reaction mixture between 6 and 12, usually between 7 and 9. Consequently, suitable buffering agents may be already present in the polymerization medium, depending on the polymerization recipe.

While the particular mechanism by which the acid anhydride, peroxygen compound and haloformate (in the presence of the alkaline buffering agent) cause polymerization of the monomeric materials described above is not known with certainty, it is believed that when hydrogen peroxide is the peroxygen compound, a mixture of three peroxy compounds, namely, a diacyl peroxide, a peroxydicarbonate and an acyl peroxycarbonate, are produced in situ and in the presence of the monomer, which peroxy compounds decompose and initiate the polymerization reaction. When the peroxygen compound is the peracid, it is belived that a diacyl peroxide and acyl peroxycarbonate are produced in situ.

While not wishing to be bound by any particular theory, it is belived from the evidence at hand that when the peroxygen compound is hydrogen peroxide, at least a portion of the anhydride combines with hydrogen peroxide to form the corresponding peroxy acid (peracid) and that such peracid combines with further acid anhydride to form the corresponding diacyl peroxide. Similarly, the hydrogen peroxide combines with the haloformate to form a peroxydicarbonate. Further, it is belived that the acid anhydride and alkyl haloformate combine to form an acyl peroxycarbonate. When the peroxygen compound is the peroxy acid, it is belived that the anhydride combines with the peracid to form a diacyl peroxide and the peracid combines also with the haloformate to form an acyl peroxycarbonate.

The aforementioned peroxy compounds decompose to form free radicals which initiate the polymerization of the monomeric material. From the experimental evidence at hand, it appears that the formation of the aforementioned peroxy compounds occurs concurrently with the polymerization reaction. By choosing properly the acid anhydride, peroxygen compound and haloformate, it is possible to produce a variety of diacyl peroxides in the polymerization medium. Moreover it is possible to utilize mixed ahydrides, i.e., unsymmetrical anhydrides, to provide further variations in the specific diacyl peroxide or acyl peroxycabonate produced. Similarly, it is possible to produce a variety of peroxydicarbonate and acyl peroxycarbonate esters in the polymerization medium. Since the reactivity of the peroxy compounds described above depends, in part, on the nature of the alkyl substituents surrounding the peroxy grouping, it is, therefore, possible to conduct polymerization with a wide variety of peroxy compounds without the attendant hazards associated with the use of the preformed peroxygen compounds.

Moreover, by utilizing more than one acid anhydride and/or moe than one peroxy acid and/or more than one haloformate, it is possible to produce several different peroxy compounds of the same general class in the polymerization medium and thereby conduct the polymerization in the presence of peroxy compounds having different reactivities.

The peroxy compounds that are believed to be produced in situ when hydrogen peroxide is the peroxygen compound used in the initiator system are:

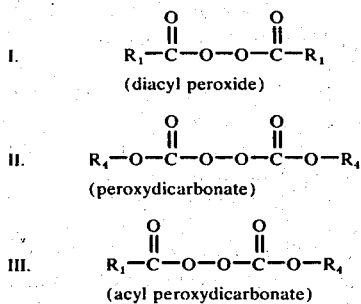

wherein $R_1$, and $R_4$ are as defined above.

The peroxy compounds that are belived to be produced in situ when peroxy acid is the peroxygen compound used in the initiator system are:

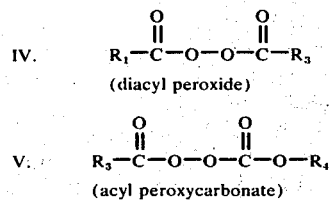

wherein $R_1$, $R_3$ and $R_4$ are as defined above.

Typical examples of diacyl peroxides coming within formulae I and IV include: diacetyl, dipropionyl diisobutyryl, di-n-butyryl, dipivaloyl, diisovaleryl, di-2-ethylhexanoyl, dibenzoyl, acetyl isobutyryl, acetyl butyryl, acetyl valeryl, acetyl propionyl, acetyl pivaloyl, acetyl benzoyl and acetyl-2-methyl butyryl peroxides.

Typical examples of peroxydicarbonates include those peroxy dicarbonates in which $R_4$ in formula II is ethyl, n-propyl, isopropyl, n-butyl, isobutyl, secondary butyl, tertiary butyl, capryl, 2-ethylhexyl, benzyl, cyclohexyl and 4-tertiary butyl cyclohexyl. Typical examples of acyl peroxycarbonates coming within formulae III and V include those in which $R_1$ is methyl, ethyl, isopropyl, propyl, t-butyl, $R_3$ is methyl and $R_4$ is ethyl, n-propyl, isopropyl, n-butyl, secondary butyl, isobutyl, tertiary butyl, 2-ethylhexyl, cyclohexyl, 4-tertiarybutyl cyclohexyl, benzyl and phenyl.

The theoretical yield of peroxy compounds required to conduct the polymerization process typically varies from about 0.001 to about 1.0 weight percent, preferably from about 0.01 to about 0.05 weight percent, based on the total amount of monomer or monomeric material used. More generally, the amount of peroxy compounds which are required to initiate the polymerization reaction is commonly referred to as an initiating amount. Thus, the amounts of initiator reactants used are chosen to produce a theoretical yield of peroxy compound which is in the aforementioned range, i.e., an initiating amount.

The present process of providing in situ peroxide initiators in a polymerization system, especially initiating amounts of peroxide, is applicable particularly to both emulsion and suspension polymerizations, i.e., polymerizations conducted in an aqueous medium, as well as bulk polymerizations wherein no solvent or aqueous medium (water) is used. Bulk polymerization is the polymerization of pure monomer(s) during which the only additives present are such aids to polymerization as initiators, chain regulators, activators, etc. The present process is also considered to be utilizable for solution polymerizations wherein the polymerization is carried out in the presence of a solvent. In the cae of bulk polymerizations, soluble organic base is used as the alkaline buffering reagent. For purposes of brevity, both types of aqueous polymerizations will be referred to collectively as a suspension polymerization. By initiating amount is meant those amounts of initiator reactants that when used collectively are sufficient to cause polymerization of the polymerizable monomer, i.e., sufficient to form polymer molecules from the particular monomer(s) used. Typically, an amount of initiator reactants are used to provide at least about 80 percent conversion of monomer after 16 hours at the temperature of the polymerization.

The practice of the present process is especially useful in the polymerization of monomeric materials heretofore described in an aqueous medium. In a typical suspension polymerization, the polymerization vessel is filled with water to which is added suspending agents, chain terminators, acid anhydride(s), haloformate(s), peroxy acid(s) and/or hydrogen peroxide and alkaline buffering agent. The polymerizable monomer is then charged to the vessel and the vessel closed.

The amount of water used, which is typically demineralized water, is large, based on the amount of monomeric material charged to the vessel. Dilution ratios of 2:1 to 40:1, usually 3:1 to about 20:1 are common. At such dilution ratios, it is surprising to find that the acid anhydride, haloformate and peracid or hydrogen peroxide in the typical amounts used to produce initiating amounts of initiator, appear to react with one another to generate in situ in the presence of the polymerizable monomer what is believed to be diacyl peroxide, peroxydicarbonate and acyl peroxycarbonate compounds. That is especially surprising since the acid anhydride, haloformate and peracid also hydrolyze in water. It, therefore, might have been assumed that with the above dilutions, the competing hydrolysis reactions of the acid anhydride, haloformate and peracid would proceed at such a rate that little, if any, peroxide would be formed, much less, the amount needed to initiate and sustain a polymerization reaction. Thus, when an acid halide, e.g., acid chloride, is used in the polymerization medium with hydrogen peroxide, the hydrolysis reaction apparently predominates since essentially no polymerization occurs.

The temperature at which polymerization of the above-described monomeric materials is conducted can, of course, vary over a wide range. The particular temperature used will depend on the particular material polymerized and the properties of the polymer desired since, as stated heretofore, the polymerization temperature affects the properties of the polymer. Generally, such polymerizations are conducted at temperatures of from about 0°C. to about 95°C. With particular reference to the polymerization of vinyl chloride and the copolymerization of vinyl chloride with other copolymerizable monomers, e.g., vinyl acetate or vinylidene chloride, polymerization temperatures typically range from about 20°C. to about 70°C.

In conducting the process of the present invention, acid anhydride, haloformate, peroxygen compound, i.e., hydrogen peroxide or peracid and buffering reagent, if not already present, are introduced simultaneously or in any sequential order into the polymerization vessel, i.e., into the medium in which the polymerization is conducted and into the presence of the monomer. Preferably the aforementioned compounds are introduced separately; however, they may be mixed momentarily in the absence of base before introduction for convenience, e.g., charging to the vessel through one inlet port. However, that procedure is not recommended since hydrogen halide, e.g., HCl, will be evolved. The manner of addition of the acid anhydride, haloformate peroxygen compound or alkaline buffering reagent to the polymerization medium is not critical to the practice of the present process. Thus, the initiator reactant components can be introduced all at once or metered in continuously or intermittently, diluted with a suitable solvent or diluent, or in undiluted form. By suitable solvent or diluent is meant any material that does not affect the stability of the initiator reactant components or deleteriously affect the polymerization of the monomer(s) being polymerized or the properties of the polymer product. While reference is made to polymerization vessels, etc., it is not intended that the use of the present initiator system be limited thereto. Thus, the system can be used in any container wherein initiators are required, e.g., molds, lay-ups, etc. It is preferred that the alkaline buffering reagent be added to the polymerization vessel first and then the initiator system reactants added separately and substantially simultaneously.

As mentioned, much of the commercial polymerizations of the above-described monomers occur in an aqueous polymerization medium to which has been added an emulsifying or suspending agent. Such agents aid in suspending or dispersing the polymer particles in the aqueous medium as they are formed, i.e., to form a latex or slurry type effluent, usually having 35 percent or more dispersed solids, that is discharged from the polymerization vessel.

The particular suspending agent used in the practice of the present process is not critical. Such materials can be non-ionic, cationic or antionic, as well as mixtures thereof. Examples of anionic agents are the sodium salts of sulfated or sulfonated hydrocarbons and fatty acids, such as dioctyl sodium sulfosuccinate, sodium dodecylbenzenesulfonate, sodium decylbenzenesulfonate, ammonium laurylbenzenesulfonate, potassium stearylbenzenesulfonate, potassium myristylnaphthalenesulfonate, potassium oleate, ammonium laurate, sodium laurate; sulfonated diesel oil and sodium lauryl sulfate (Duponol ME), sodium alkylnaphthalenesulfonate (Ketal BX-78), sodium salt of sulfated alkylphenoxypolyoxyethylene (Alipol CO-433), ammonium dodecylphenoxypolyoxyethylene ethyl sulfate, nonylphenoxy acetic acid, sulfated cresylic acid, disodium-N-octadecylsulfosuccinanate, tetrasodium N-(1,2-dicarboxyethyl)-N-octadecylsulfosuccinate, diamyl ester of sodium sulfosuccinic acid, dihexyl ester of sodium sulfosuccinic acid, bis(tridecyl) ester of sodium sulfosuccinic acid, dioctyl sodium sulfosuccinate, sodium dodecyl diphenyl oxide disulfonate, benzene potassium sulfonate, sodium salt of a sulfonated naphthaleneformaldehyde condensate, sodium salt of polyethoxy alkyl phenol sulfonate, sodium oleyl methyl tartrate and triethanolamine salt of polyethoxy alkyl phenol sulfonate and complex organic phosphates (Gafac Re-610). Examples of cationic agents are quaternary ammonium compounds, such as stearamidopropyl dimethyl-beta-hydroxyethyl ammonium nitrate, cetyl pyridinium chloride and cetyl trimethylammonium bromide.

Examples of non-ionic agents are high molecular weight polymers of propylene oxide and ethylene oxide, nonylphenoxypoly(ethyleneoxy)ethanols (Igepal CO-630 and CO-880), polyoxyethylated fatty alcohol (Emulphor ON-870), alkyl aryl polyether alcohols, such as lauryl phenyl polyether ethanol, alkanolamine fatty acid condensates, such as triethanolamine coconut fatty acid ethanolamide, lauric acid propanolamide, fatty alcohol polyglycol ether, myristyl phenol polyglycol ether, polyoxyethylene monooleate, polyoxyethylene sorbitol septaoleate, polyoxyethylene sorbitol oleate, laurate, polyoxyethylene cetyl alcohol, polyoxyethylene stearate, glycolamido stearate, and other polyoxyethylene alkanols and alky phenols containing from 2 to 40 moles of ethylene oxide per mole of alkanol or alkyl phenol.

Anionic suspending agents are preferred since they are more efficient in stabilizing the resultant polymer latex. Of these, some will be found being more useful than others, depending on the process conditions and the most suitable may be found by simple experimentation. Other suspending agents that can be used in the practice of the present process are protective colloids, such as gelatin, methyl cellulose, gum tragacanth and completely or partially hydrolyzed polyvinyl acetates. Other agents include hydroxylated phosphatides of soybean oil complex (Hydroxy Lecithin).

The amount of suspending agent used typically varies from 0.3 to 5 percent, based on the weight of the polymerizable monomers, although greater or lesser amounts can be used in some circumstances since the efficiencies of individual agents vary. The suspension of the monomer in the aqueous medium can be formed by any suitable means, such as by stirring or agitating the monomer, water and suspending agent, together in a vessel.

In a further embodiment of the present process, at least one further preformed organic free-radical initiator that generates free radicals under the polymerization conditions used is introduced into the polymerization medium in addition to the acid anhydride, haloformate, and peroxygen compound, i.e., the peracid or hydrogen peroxide. In the most preferred application of the present process, a free-radical initiator having a good efficiency of free-radical generation at temperatures approximating the desired polymerization temperature is used. Such temperature is typically above that at which the peroxy compounds theoretically generated by the initiator system reactants have a high efficiency. For example, utilization of isobutyric anhydride and hydrogen peroxide theoretically results in the formation of diisobutyryl peroxide which has a high free-radical generation efficiency at a temperature range of from about 30°C. to 40°C. The use of isopropyl chloroformate in combination therewith theoretically results in the formation of diisopropyl peroxydicarbonate, an organic peroxy compound having a high free-radical generation efficiency at about 45°–55°C., a further preformed free-radical initiator having a high free-radical generation efficiency at temperatures greater than about 55°C. can be used in accordance with the aforementioned further embodiment. Thus, the polymerization is initiated substantially immediately with the diisobutyryl peroxide, sustained with the diisopropyl peroxydicarbonate and completed with the further preformed organic free-radical initiator. In this manner, polymerization is initiated at the beginning of the polymerization cycle and continued smoothly until completion.

By proper choice of initiator components, i.e., by balancing the reactivities of the theoretical diacyl peroxide(s) and peroxycarbonate ester(s) generated and the further preformed organic free-radical initiator, free-radical generation can be maintained fairly evenly over substantially the entire polymerization cycle. Thus, as the rate of free-radical generation from the diacyl peroxide source starts to decline, the rate of free-radical generation from the peroxycarbonate ester starts to increase, and as the rate of free-radical generation from the peroxycarbonate ester starts to decline, the rate of free-radical generation from the further free-radical initiator will start to increase. The end result is a smooth and continuous polymerization of generally shorter cycle times than by the use of individual free-radical initiators. The reactivities of organic peroxides can be easily approximated by investigating the decomposition kinetics in a suitable solvent, such as mineral spirits. Reactivities of most commercially available organic peroxides are published in the literature in terms of half-life values at various temperatures.

The amount of further preformed organic free-radical initiator used will vary and will depend upon the temperature of the polymerization and the theoretical amount of peroxy compounds generated. Typically, however, from about 0.001 to about 0.50 weight percent of further preformed free-radical initiator, based on the total amount of monomer, is employed. The further organic free-radical initiator compound can be introduced into the polymerization medium at any time. Thus, it can be introduced separately or along with the initiator system reactants, the monomer or the water or solvent, if used. In addition, it can be metered separately into the polymerization vessel during the polymerization, e.g., after polymerization has been commenced and near exhaustion of the peroxy compounds generated in situ.

Of the further free-radical initiators that can be added to the polymerization vessel, there can be mentioned tertiarybutyl peroxyesters, e.g., tertiarybutyl perpivalate, tertiarybutyl perbenzoate, ditertiarybutyl diperphthalate and tertiarybutyl perneodecanoate; diacyl peroxides, e.g., lauroyl peroxide, benzoyl peroxide, 2,4-dichlorobenzoyl peroxide and acetyl benzoyl peroxide; ketone peroxides, e.g., methyl ethyl ketone peroxide, cyclohexanone peroxide and methyl amyl ketone peroxide; organic hydroperoxides, e.g., cyclohexyl hydroperoxide, cumene hydroperoxide and tertiarybutyl hydroperoxide; and non-peroxidic initiators, e.g., azo-bisisobutyronitrile.

The present process is more particularly described in the following examples which are intended as illustrative only since numerous modifications and variations therein will be apparent to those skilled in the art.

EXAMPLE I

Standard 28 fluid ounce polymerization bottles were filled with a stock solution of 300 grams of demineralized water that contained 0.3 grams of methocel 65 HG suspending agent and 0.05 grams of sodium bicarbonate. The contents of the bottles were frozen and thereafter, an additional 0.25 grams of sodium bicarbonate, 100 grams of liquid vinyl chloride and the initiator reactants were charged to each of the bottles. The initiator reactants and their amounts were:

| COMPOUND | AMOUNT |
|---|---|
| ethyl chloroformate | $3.0 \times 10^{-4}$ moles |
| isobutyric anhydride | $6.0 \times 10^{-4}$ moles |
| hydrogen peroxide | $4.5 \times 10^{-4}$ moles |

The bottles were capped and placed in a constant temperature bath maintained at 50°C. where they were tumbled to agitate the contents. At various intervals, a bottle was removed from the polymerization bath and the unreacted vinyl chloride vented by inserting a hypodermic needle through the cap of the bottle until constant weight was reached. The weight loss was used to calculate the weight of polymer formed. The results of such analyses are tabulated in Table I.

TABLE I

| Time, Hours | % Conversion |
|---|---|
| 2 | 17 |
| 4 | 33 |
| 6 | 45 |
| 9 | 65 |
| 16 | 88 |

EXAMPLE II

The procedure of Example I was followed except that the initiator reactants and their amounts were:

| COMPOUND | AMOUNT |
|---|---|
| ethyl chloroformate | $3.0 \times 10^{-4}$ moles |
| isobutyryl chloride | $6.0 \times 10^{-4}$ moles |

| COMPOUND | AMOUNT |
|---|---|
| hydrogen peroxide | $4.5 \times 10^{-4}$ moles |

The results are tabulated in Table II.

TABLE II

| Time, Hours | % Conversion |
|---|---|
| 2 | 1 |
| 4 | 9 |
| 6 | 18 |
| 9 | 22 |
| 16 | 43 |

The data of Table I show that the combination of an alkyl chloroformate, e.g., ethyl chloroformate, an organic acid anhydride, e.g., isobutyric anhydride, and hydrogen peroxide in a buffered medium effects the polymerization of an ethylenically unsaturated material, e.g., vinyl chloride. The data of Table II show that when isobutyryl chloride is substituted for isobutyric anhydride only about half as much monomer (43 vs. 88 percent) is converted to polymer.

EXAMPLE III

The procedure of Example I was followed except that no ethyl chloroformate initiator reactant was used and the amounts of initiator reactants used were:

| COMPOUND | AMOUNT |
|---|---|
| isobutyric anhdyride | $8.0 \times 10^{-4}$ |
| hydrogen peroxide | $4.0 \times 10^{-4}$ |

Results are tabulated in Table III.

EXAMPLE IV

The procedure of Example I was followed except that no isobutyric anhydride initiator reactant was used and the amounts of initiator reactants used were:

| COMPOUND | AMOUNT |
|---|---|
| ethyl chloroformate | $6.7 \times 10^{-4}$ |
| hydrogen peroxide | $3.3 \times 10^{-4}$ |

Results are tabulated in Table III.

EXAMPLE V

The procedure of Example II was followed except that no ethyl chloroformate initiator reactant was used and the amounts of initiator reactants used were:

| COMPOUND | AMOUNT |
|---|---|
| isobutyryl chloride | $16.7 \times 10^{-4}$ |
| hydrogen peroxide | $8.1 \times 10^{-4}$ |

Results are tabulated in Table III

TABLE III

| Example | Reactants | % Conversion of Monomer at | | | | |
|---|---|---|---|---|---|---|
| | | 2 hrs. | 4 hrs. | 6 hrs. | 9 hrs. | 16 hrs. |
| III | isobutyric anhydride hydrogen peroxide | 24 | 36 | 43 | —[a] | 50 |
| IV | ethyl chloroformate hydrogen peroxide | — | — | — | — | 86,90[b] |
| V | isobutyryl chloride hydrogen peroxide | — | — | — | — | 0 |

[a]indicated not measured
[b]duplicate runs

The data of Exampls III–V show that when isobutyryl chloride and hydrogen peroxide are used alone in the buffered polymerization medium to polymerize vinyl chloride, no significant amount of polymerization occurs (Example V). Thus, the isobutyryl chloride of Example II does not assist apparently in the polymerization and the initiation is caused by ethyl chloroformate and hydrogen peroxide. Example IV shows that by increasing the amount of ethyl chloroformate used in Example II, conversions of greater than 80 percent, e.g., 86 and 90 percent, can be obtained in 16 hours at 50°C. The data of Example III show that the combined use of isobutyric anhydride and hydrogen peroxide can effect the polymerization of vinyl chloride and thus the further proper use of ethyl chloroformate with the aforesaid system can provide conversions of greater than 80 percent after 16 hours. (See Example I).

EXAMPLE VI

The procedure of Example I was followed except that the amount of ethyl chloroformate was increased to $6.0 \times 10^{-4}$ moles and the amount of isobutyric anhydride was decreased to $3.0 \times 10^{-4}$ moles. The polymerization temperature was 54°C. and after 7 hours, 91 percent of the vinyl chloride monomer was converted to polymer.

EXAMPLE VII

The procedure of Example I was followed except that the amount of ethyl chloroformate was $4.0 \times 10^{-4}$ moles, the amount of isobutyric anhydride was $3.0 \times 10^{-4}$ moles and the amount of hydrogen peroxide was $3.5 \times 10^{-4}$ moles. The polymerization temperature was 54°C. and after 7 hours, 68 percent of vinyl chloride monomer was converted to polymer.

EXAMPLE VIII

The procedure of Example I is followed except that the initiator reactants and their respective amounts are: isopropyl chloroformate $- 3.0 \times 10^{-4}$ moles; isobutyric anhydride $- 6.0 \times 10^{-4}$ moles; and hydrogen peroxide $- 4.5 \times 10^{-4}$ moles. The polymerization temperature is 45°C. About 47 percent of vinyl chloride monomer is converted to polymer after about 4 hours, and about 89 percent of the monomer is converted to polymer after about 10 hours.

EXAMPLE IX

The procedure of Example VIII is followed except that the polymerization temperature is programmed for the following schedule: 2 hours at 40°C., 3 hours at 45°C., and 3 hours at 50°C. At the end of the 8 hours of polymerization, it is estimated that about 91 percent of monomer will be converted.

EXAMPLE X

The procedure of Example I is followed except that the initiator reactants and the amounts used are: secondary butyl chloroformate — $5.0 \times 10^{-4}$ moles, n-butyric anhydride — $3.0 \times 10^{-4}$ moles, and hydrogen peroxide — $4.0 \times 10^{-4}$ moles. The polymerization temperature is 54°C. After about 7 hours, it is estimated that about 85 percent of monomer will be converted.

EXAMPLE XI

The procedure of Example I is followed except that the initiator reactants and the amounts used are: isopropyl chloroformate — $3.0 \times 10^{-4}$ moles, isobutyric anhydride — $5.0 \times 10^{-4}$ moles, and peracetic acid — $8.0 \times 10^{-4}$ moles. The polymerization temperature is 54°C. After about 16 hours, it is estimated that about 90 percent of monomer will be converted.

EXAMPLE XII

The procedure of Example I is followed except that the initiator reactants and the amounts used are cyclohexyl chloroformate — $4.0 \times 10^{-4}$ moles, propionic anhydride — $4.0 \times 10^{-4}$ moles, and hydrogen peroxide — $4.0 \times 10^{-4}$ moles. The polymerization temperature is 60°C. It is estimated that about 89 percent of monomer will be converted after about 16 hours.

I claim:

1. In the process for polymerizing ethylenically unsaturated material selected from the group consisting of vinyl chloride and mixtures of vinyl chloride and copolymerizable monomer, said mixture containing greater than 50 mole percent vinyl chloride, in an aqueous or bulk polymerization medium, the improvement which comprises conducting said polymerization in the presence of an initiator system comprising, in combination, a. alkaline buffering reagent,
b. organic acid anhydride represented by the general formula:

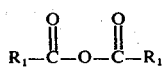

wherein $R_1$ is selected from the group consisting of substituted and unsubstituted $C_1 - C_{20}$ alkyl, $C_6 - C_{10}$ cycloalkyl, and $C_6 - C_{10}$ aryl radicals, c. peroxygen compound selected from the group consisting of organic peroxy acid and hydrogen peroxide, said organic peroxy acid being represented by the general formula:

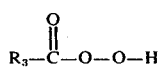

wherein $R_3$ is selected from the group consisting of substituted and unsubstituted $C_1 - C_{20}$ alkyl and $C_6 - C_{10}$ aryl radicals, and d. hydrocarbon haloformate represented by the general formula:

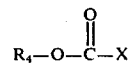

wherein $R_4$ is selected from the group consisting of $C_1 - C_{20}$ alkyl, $C_6 - C_{12}$ cycloalkyl, $C_7 - C_{10}$ aralkyl, and $C_6 - C_8$ aryl radicals and X is chloride or bromine, the mole ratio of hydrocarbon haloformate to acid anhydride being between about 0.1:1 and about 10:1, thereby generating polymerization initiator in situ in said polymerization medium, said acid anhydride, peroxygen compound and hydrocarbon haloformate being present in amounts sufficient to generate, in the presence of said alkaline buffering reagent, an initiating amount of said initiator and thereby polymerize the ethylenically unsaturated material.

2. The process of claim 1 wherein the alkaline buffering reagent is sodium bicarbonate or quaternary ammonium hydroxide.

3. The process of claim 1 wherein the anhydride is isobutyric anhydride, propionic anhydride, acetic anhydride, pivalic anhydride, or mixtures of such anhydrides.

4. The process of claim 1 wherein the peroxy acid is peracetic acid.

5. The process of claim 1 wherein $R_4$ is ethyl, N-propyl, isopropyl, n-butyl, isobutyl, secondary butyl, tertiary butyl, 2-ethylhexyl, cyclohexyl, 4-tertiarybutyl cyclohexyl, phenyl and benzyl.

6. The process of claim 1 wherein from about 0.001 to about 3 weight percent of organic acid anhydride and hydrocarbon haloformate, based on ethylenically unsaturated material, is used and the mole ratio of peroxygen compound to organic acid anhydride and hydrocarbon haloformate is from 2:1 to about 10:1 when the peroxygen compound is peroxy acid and from 0.1:1 to about 10:1 when the peroxygen compound is hydrogen peroxide.

7. The process of claim 6 wherein the mole ratio of peroxygen compound to organic acid anhydride and hydrocarbon haloformate is about 1:1 when the peroxygen compound is peroxy acid and from 0.2:1 to about 2:1 when the peroxygen compound is hydrogen peroxide.

8. The process of claim 1 wherein the initiator system comprises more than one acid anhydride, more than one hydrocarbon haloformate or more than one of each of the acid anhydride and hydrocarbon haloformate.

9. In the process for polymerizing ethylenically unsaturated material selected from the group consisting of vinyl chloride and mixtures of vinyl chloride and copolymerizable monomer, said mixture containing greater than 50 mole percent vinyl chloride, in an aqueous or bulk polymerization medium, the improvement which comprises conducting said polymerization in the presence of an initiator system comprising, in combination, a. alkaline buffering reagent,
b. organic acid anhydride representable by the general formula:

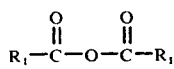

wherein $R_1$ and $R_2$ are each selected from the group consisting of $C_1$–$C_{12}$ alkyl radicals, c. hydrogen peroxide, and
d. hydrocarbon chloroformate representable by the formula:

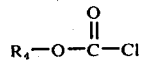

wherein $R_4$ is selected from the group consisting of $C_2$ – $C_{12}$ alkyl, $C_6$ – $C_{10}$ cycloalkyl, and benzyl, the mole ratio of hydrocarbon chloroformate to acid anhydride being between about 0.2:1 and about 1:1, thereby generating polymerization initiator in situ in said polymerization medium, said acid anhydride, hydrogen peroxide and hydrocarbon chloroformate, being present in amounts sufficient to generate, in the presence of said alkaline buffering reagent, an initiating amount of said initiator and thereby polymerize the ethylenically unsaturated material.

10. The process of claim 9 wherein the acid anhydride is isobutyric anhydride, propionic anhydride, acetic anhydride, pivalic anhydride, or mixtures of such anhydrides, and the hydrocarbon chloroformate is ethyl chloroformate, n-propyl chloroformate, isopropyl chloroformate, n-butyl chloroformate, isobutyl chloroformate, secondarybutyl chloroformate, tertiarybutyl chloroformate, 2-ethylhexyl chloroformate, cyclohexyl chloroformate, 4-tertiarybutyl cyclohexyl chloroformate, phenyl chloroformate, benzyl chloroformate, or mixtures of such chloroformates.

11. The process of claim 10 wherein the alkaline buffering reagent is sodium bicarbonate or quaternary ammonium hydroxide.

12. In the process for polymerizing ethylenically unsaturated material selected from the group consisting of vinyl chloride and mixtures of vinyl chloride and copolymerizable monomer, said mixture containing greater than 50 mole percent vinyl chloride, in an aqueous or bulk polymerization medium, the improvement which comprises conducting said polymerization in the presence of an initiator system comprising, in combination, a. alkaline buffering reagent,
b. organic acid anhydride representable by the general formula:

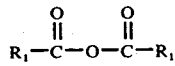

wherein $R_1$ is selected from the group consisting of $C_1$ – $C_{12}$ alkyl radicals, c. organic peroxy acid representable by the general formula:

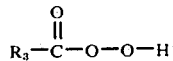

wherein $R_3$ is selected from the group consisting of $C_1$–$C_{12}$ alkyl radicals, and
d. hydrocarbon chloroformate representable by the general formula:

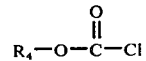

wherein $R_4$ is selected from the group consisting of $C_2$ – $C_{12}$ alkyl radicals, $C_6$ – $C_{10}$ cycloalkyl and benzyl, the mole ratio of hydrocarbon chloroformate to acid anhydride being between about 0.2:1 and about 1:1, thereby generating polymerization initiator in situ in said polymerization medium, said acid anhydride, peroxy acid and hydrocarbon chloroformate being present in amounts sufficient to generate, in the presence of said alkaline buffering reagent, an initiating amount of said initiator and thereby polymerize the ethylenically unsaturated material.

13. The process of claim 12 wherein the acid anhydride is isobutyric anhydride, propionic anhydride, acetic anhydride, pivalic anhydride, or mixtures of such anhydrides, the peroxy acid is peracetic acid and the hydrocarbon chloroformate is ethyl chloroformate, n-propyl chloroformate, isopropyl chloroformate, n-butyl chloroformate, isobutyl chloroformate, secondarybutyl chloroformate, tertiarylbutyl chloroformate, 2-ethylhexyl chloroformate, cyclohexyl chloroformate, 4-tertiarybutyl chloroformate, phenyl chloroformate, benzyl chloroformate, or mixtures of such chloroformates.

14. The process of claim 13 wherein the alkaline buffering reagent is sodium bicarbonate or quaternary ammonium hydroxide.

15. The process of claim 6 wherein both hydrogen peroxide and organic peroxy acid are used a the peroxygen compound.

16. The process of claim 10 wherein from about 0.01 to about 1 weight percent organic acid anhydride, based on ethylenically unsaturated material, and from about 0.1 to about 10.0 moles of hydrogen peroxide per mole of the sum of organic acid anhydride and hydrocarbon chloroformate are used.

17. The process of claim 13 wherein from about 0.01 to about 1 weight percent organic acid anhydride, based on ethylenically unsaturated material, and from about 0.2 to about 10 moles of organic peroxy acid per mole of the sum of organic acid anhydride and hydrocarbon chloroformate are used.

* * * * *